(12) United States Patent
Dettori et al.

(10) Patent No.: US 8,079,341 B2
(45) Date of Patent: Dec. 20, 2011

(54) PISTON FOR AN INTERNAL COMBUSTION ENGINE

(75) Inventors: Franco Dettori, Mondercange (LU); Karl Glinsner, Wels (AT); Martin Olejniczak, Lambach (AT)

(73) Assignee: BRP-Powertrain GmbH & Co. KG., Gunskirchen (AT)

( * ) Notice: Subject to any disclaimer, the term of this patent is extended or adjusted under 35 U.S.C. 154(b) by 526 days.

(21) Appl. No.: 12/361,750

(22) Filed: Jan. 29, 2009

(65) Prior Publication Data
US 2009/0188464 A1   Jul. 30, 2009

Related U.S. Application Data

(60) Provisional application No. 61/024,535, filed on Jan. 29, 2008.

(51) Int. Cl.
*F02F 3/00* (2006.01)
(52) U.S. Cl. ........ 123/193.6; 92/238
(58) Field of Classification Search ....... 123/193.6; 92/238
See application file for complete search history.

(56) References Cited

U.S. PATENT DOCUMENTS

| 2,100,719 A | 11/1937 | Nelson |
| 2,607,643 A * | 8/1952 | Townhill ............ 92/228 |
| 5,146,883 A | 9/1992 | Reipert et al. |

* cited by examiner

*Primary Examiner* — Michael Cuff
*Assistant Examiner* — James Kim
(74) *Attorney, Agent, or Firm* — Osler, Hoskin & Harcourt LLP (57) ABSTRACT

A piston for an internal combustion engine is disclosed. The piston body has two pin bores for receiving a piston pin. At least one rib is disposed on the second side and extends outwardly therefrom. The at least one rib is aligned laterally between the two pin bores in a direction along the piston pin axis. The at least one rib has a longitudinal axis extending generally perpendicular to both the reciprocation axis of the piston and the piston pin axis. A piston having a boss extending approximately within the piston pin radius of the piston pin axis, and a piston having a boss generally following the contour of the piston pin are also disclosed. An engine having the piston is also disclosed.

27 Claims, 6 Drawing Sheets

PISTON FOR AN INTERNAL COMBUSTION ENGINE

This application claims priority to U.S. Provisional Patent Application No. 61/024,535 filed Jan. 29, 2008, the entirety of which is enclosed herein by reference.

FIELD OF THE INVENTION

The present invention relates to a piston for an internal combustion engine, and to an internal combustion engine having the piston.

BACKGROUND OF THE INVENTION

Internal combustion engines of the two-stroke and four-stroke varieties are driven by the combustion of fuel in one or more combustion chambers. The combustion of fuel drives a piston to reciprocate within a cylinder. The piston drives a connecting rod, which drives a crankshaft to rotate. The rotation of the crankshaft is transferred to wherever power is required, such as the wheels of a vehicle.

The combustion of fuel within each combustion chamber can occur as frequently as several thousand times per minute, and each combustion event exerts a force on the piston. The force can cause deformation of the piston head, by causing a deflection of the portions of the piston that are laterally farther away from the piston pin and the pin bosses. The repeated deformation stresses the piston and may ultimately cause a fracture of the piston head and resulting damage to the engine.

One solution to this problem is to construct a piston with a piston head having increased thickness in order to better withstand the stresses. However, the attendant increase in the weight of the piston results in reduced engine efficiency as more force is required to cause the piston to reciprocate within the cylinder, particularly to cause the piston to quickly reverse direction up to several thousand times per minute as the piston reciprocates within the cylinder. The additional weight may also affect the performance of a vehicle powered by the engine, particularly in recreational vehicles where the weight of the engine can be a significant proportion of the weight of the vehicle.

Another solution to this problem, particularly in high performance applications, is to use forged pistons instead of cast pistons. While forged pistons are generally more durable than cast pistons, they are made of a denser material and are more expensive to mass-produce, adding cost to the engine.

Therefore, there is a need for a piston that can withstand the forces described above while limiting the weight of the piston.

There is also a need for a piston having sufficient strength that it is suitable for use in high-performance engines.

SUMMARY OF THE INVENTION

It is an object of the present invention to ameliorate at least some of the inconveniences present in the prior art.

It is also an object of the present invention to provide a piston having sufficient strength that it is suitable for use in high-performance engines.

It is also an object of the present invention to provide a piston having a rib with a longitudinal axis extending in a direction perpendicular to both the reciprocation axis and the piston pin axis.

It is also an object of the present invention to provide an internal combustion engine with a piston having a rib with a longitudinal axis extending in a direction perpendicular to both the cylinder axis and the piston pin axis.

In one aspect, the invention provides a piston for an internal combustion engine, comprising a piston body having a first side. A second side is opposite the first side. A lateral surface extends therebetween. The lateral surface has a generally cylindrical piston head portion and a skirt portion. The piston head portion defines a reciprocation axis of the piston. Two pin bores are disposed on the second side for receiving a piston pin. The two pin bores being generally coaxial and define a piston pin axis. At least one rib is disposed on the second side and extends outwardly therefrom. The at least one rib is aligned laterally between the two pin bores in a direction along the piston pin axis. The at least one rib has a longitudinal axis extending generally perpendicular to both the reciprocation axis and the piston pin axis. The at least one rib has a length in the direction of the longitudinal axis and a width in the direction of the piston axis. The length is greater than the width.

In a further aspect, the at least one rib has a recessed portion extending generally toward the second side of the piston body. The recessed portion is positioned generally at a longitudinal center portion of the at least one rib.

In a further aspect, a shape of the recessed portion is generally a circular arc.

In a further aspect, a center of curvature of the recessed portion is disposed generally on the pin axis.

In a further aspect, the at least one rib is a single rib.

In a further aspect, the at least one rib is generally centered between the pin bores.

In a further aspect, the length of the at least one rib is greater than a radius of the piston body.

In an additional aspect, an internal combustion engine comprises a crankcase. A crankshaft is rotatably supported in the crankcase. A cylinder block is attached to the crankcase. At least one cylinder formed in the cylinder block. Each cylinder has a connecting rod having a first end pivotally connected to the crankshaft and pivotable with respect thereto, and a second end. A piston is disposed in the cylinder and capable of reciprocal motion therein along a cylinder axis. The piston has a piston body having a first side. A second side is opposite the first side. A lateral surface extends therebetween. The first side and the cylinder form at least in part a combustion chamber. The lateral surface has a generally cylindrical piston head portion and a skirt portion. Two pin bores are disposed on the second side of the piston body. A piston pin is received in the pin bores. The piston pin has a longitudinal piston pin axis perpendicular to the cylinder axis. The piston pin is pivotally connected to the second end of the connecting rod. The connecting rod is pivotable with respect to the piston about the piston pin axis. At least one rib is disposed on the second side and extends outwardly therefrom. The at least one rib is generally aligned with the connecting rod in the direction parallel to the piston pin axis. The at least one rib has a longitudinal axis extending generally perpendicular to both the cylinder axis and the piston pin axis. The at least one rib has a length in the direction of the longitudinal axis and a width along the piston axis. The length is greater than the width.

In a further aspect, the at least one rib has a recessed portion extending generally toward the second side of the piston body. The piston pin is disposed at least in part in the recessed portion.

In a further aspect, a shape of the recessed portion is generally a circular arc.

In a further aspect, a contour of the recessed portion generally follows a contour of the piston pin. The contour of the recessed portion and the contour of the piston pin form a clearance therebetween. The clearance is less than 1% of a diameter of the piston pin.

In a further aspect, the at least one rib is a single rib.

In a further aspect, the at least one rib is generally centered between the pin bores.

In a further aspect, the connecting rod has at least one slot in alignment with the at least one rib.

In an additional aspect, an internal combustion engine comprises a crankcase. A crankshaft is rotatably supported in the crankcase. A cylinder block is attached to the crankcase. At least one cylinder is formed in the cylinder block. Each cylinder has a connecting rod having a first end pivotally connected to the crankshaft and pivotable with respect thereto; and a second end having at least one slot therein. A piston is disposed in the cylinder and capable of reciprocal motion therein along a cylinder axis. The piston has a piston body having a first side. A second side is opposite the first side. A lateral surface extends therebetween. The first side and the cylinder form at least in part a combustion chamber. The lateral surface has a generally cylindrical piston head portion and a skirt portion. Two pin bores are disposed on the second side of the piston body. A piston pin is received in the pin bores. The piston pin has a longitudinal piston pin axis perpendicular to the cylinder axis and a radius perpendicular to the piston pin axis. The piston pin is pivotally connected to the second end of the connecting rod. The connecting rod is pivotable with respect to the piston about the piston pin axis. At least one boss is disposed on the second side. The at least one boss extends outwardly from the second side generally in the direction of the piston pin axis. A portion of the at least one boss generally follows a contour of the piston pin. The at least one boss is generally aligned with the at least one slot in connecting rod in the direction parallel to the piston pin axis.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
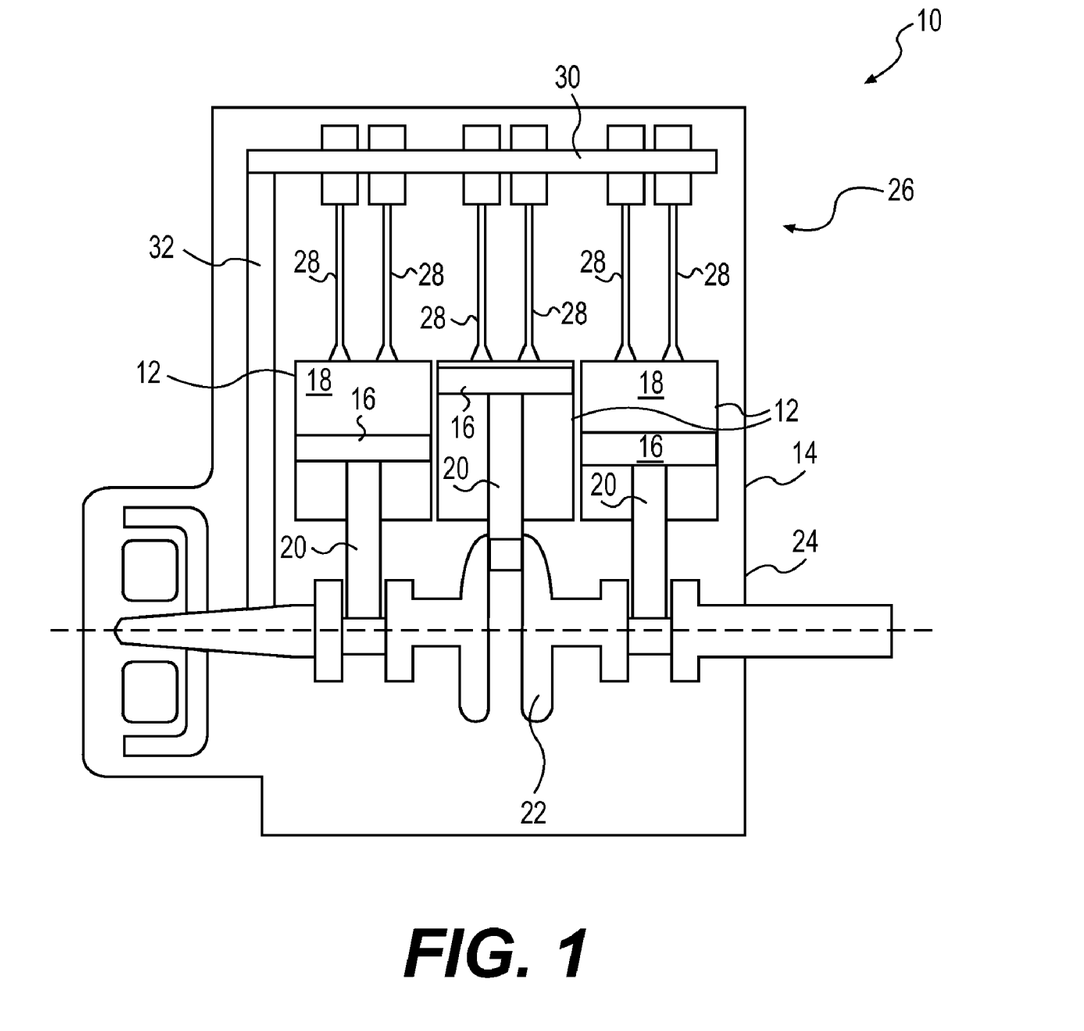
FIG. 1 is a schematic cross-sectional view of an internal combustion engine incorporating aspects of the invention.
Figure 2:
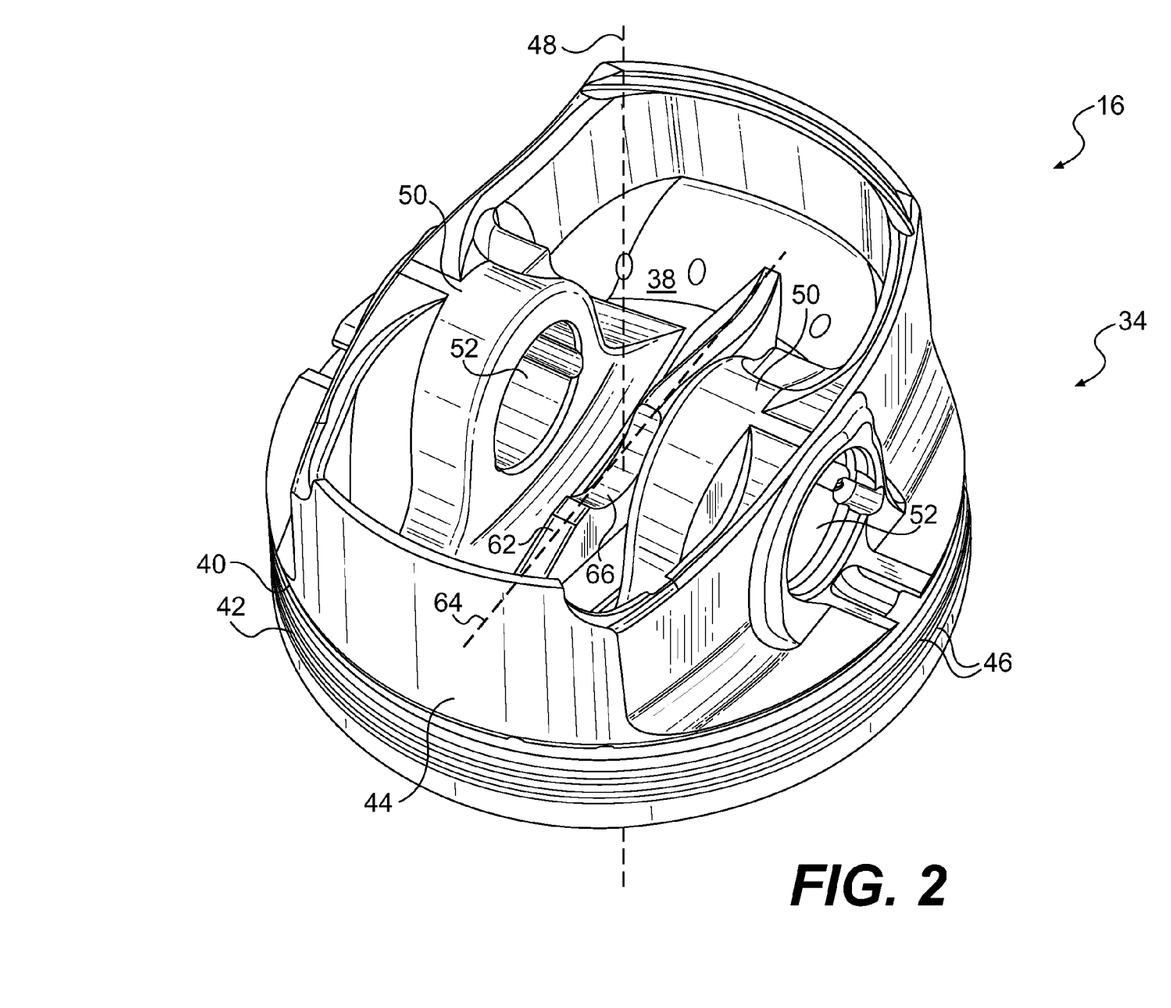
FIG. 2 is a perspective view of a piston according to an embodiment of the invention.

Referring to FIG. 1, an internal combustion engine 10 will be described, to which aspects of the present invention are applied. The engine 10 is a four-stroke internal combustion engine (shown schematically) with three cylinders 12 contained in a cylinder block 14. Each cylinder 12 has a piston 16 disposed therein. The piston 16 will be described below in further detail. Each piston 16 can reciprocate within its respective cylinder 12 to change the volume of a combustion chamber 18 associated with the cylinder 12. Each piston 16 is coupled via a connecting rod 20 to a crankshaft 22 journaled in a crankcase 24, such that combustion of fuel in the combustion chambers 18 forces the pistons 16 downward to cause rotation of the crankshaft 22. A number of valves 28 are provided in the cylinder head 26 for each cylinder 12, some of which allow fuel to enter the combustion chambers 18 for combustion therein, and others of which allow exhaust gases to exit the combustion chambers 18 after combustion has occurred. The opening and closing of the valves 28 is controlled by a camshaft 30, which is driven by the crankshaft 22 via a chain 32. Alternative valve control systems are also contemplated, such as electronically actuated valves. It should be understood that the present invention is not limited to the particular engine 10 described, and can be practiced with a variety of other engine types, including engines with more or fewer cylinders, V-type engines with cylinders arranged in two cylinder blocks, two-stroke engines and other variations that will be apparent to a person skilled in the art. It should also be understood that the engine 10 is suitable for use in many different types of vehicles, including snowmobiles, personal watercraft, ATVs, motorcycles and three-wheeled motorized vehicles, as well as any other device known in the art to be powered by an internal combustion engine, such as a generator.

Referring to FIGS. 2-5, the piston 16 will now be described.

The piston 16 has a piston body 34. One side of the piston body 34 forms a piston face 36 that faces the combustion chamber 18 and forms the combustion chamber 18 in combination with the cylinder 12 and the cylinder head 26 (see FIG. 6). As is known in the art, the piston face 36 may have an appropriate shape to provide clearance for the valves 28 or to direct the flow of fuel or air in the combustion chamber 18 for improved combustion therein. A second side 38, opposite the piston face 36, faces away from the combustion chamber 18 and will be described below in further detail.

The lateral surface 40 of the piston body 34 has a generally cylindrical piston head portion 42 and a skirt portion 44. The piston head portion 42 has a plurality of annular recesses 46 for receiving piston rings (not shown) to improve the seal between the lateral surface 40 and the wall of the cylinder 12. The piston head portion 42 defines a reciprocating axis 48 of the piston body 34. The axis 48 of the piston body 34 is coaxial with the longitudinal axis of the cylinder 12, and the piston 16 reciprocates within the cylinder 12 along the axis 48 when the engine 10 is in operation.

The second side 38 of the piston body 34 has two pin bosses 50 disposed thereon. Each pin boss 50 forms a cylindrical pin bore 52 for receiving a piston pin 54 (seen in FIG. 5). The piston pin 54 fastens the piston body 34 to the connecting rod 20 by passing through the pin bores 52 and a cylindrical bore 56 in the connecting rod 20. The piston pin 54 is held in position by connectors (not shown) in a known manner. The piston pin 54 has a longitudinal axis 58 that is generally coaxial with the axes of the pin bores 52. The connecting rod 20 can pivot with respect to the piston body 34 about the axis 58 as the crankshaft 22 rotates and the angle of the connecting rod 20 varies with respect to the piston body 34.

Figure 3:
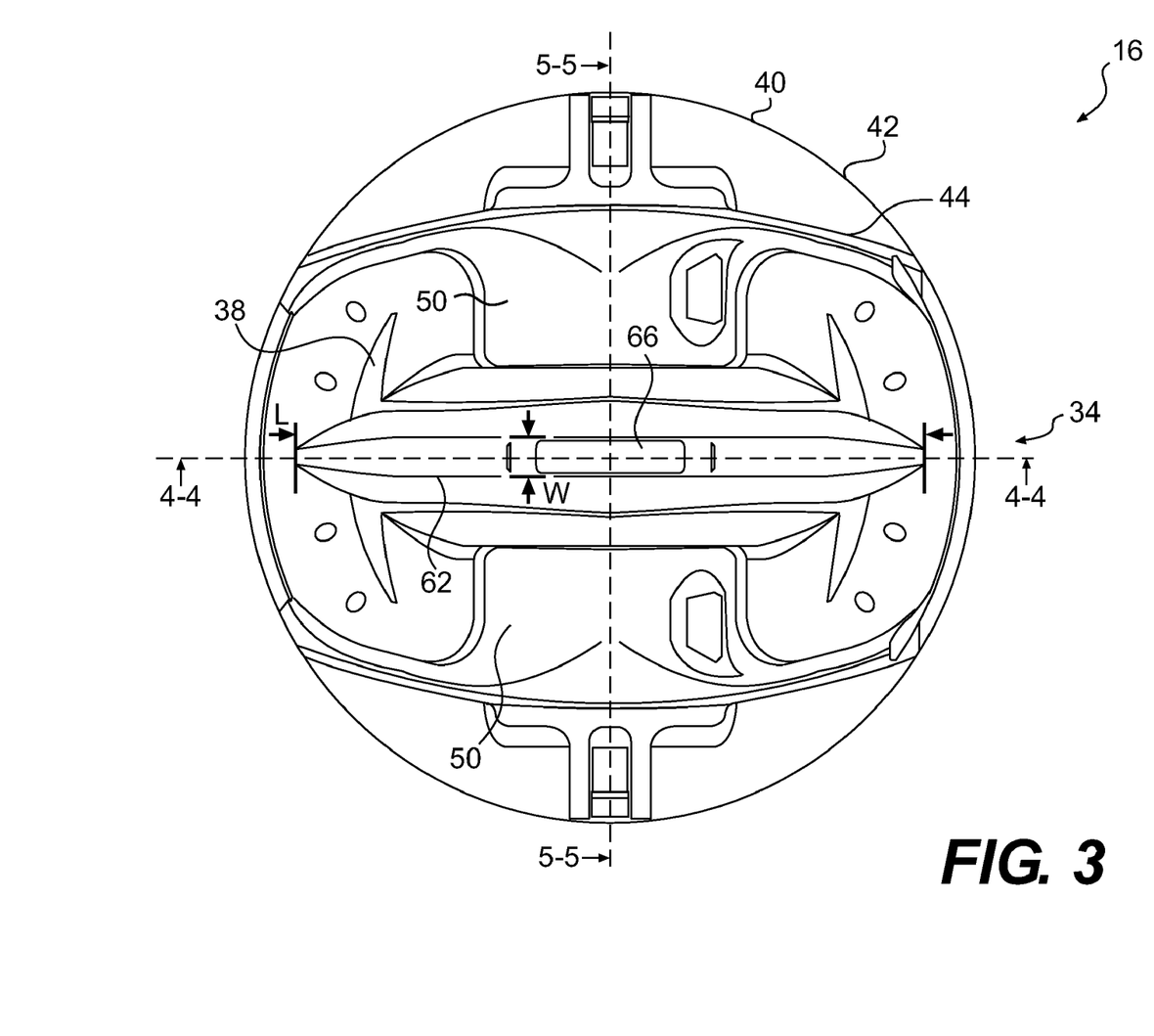
FIG. 3 is a bottom plan view of the piston of FIG. 2.
Figure 4:
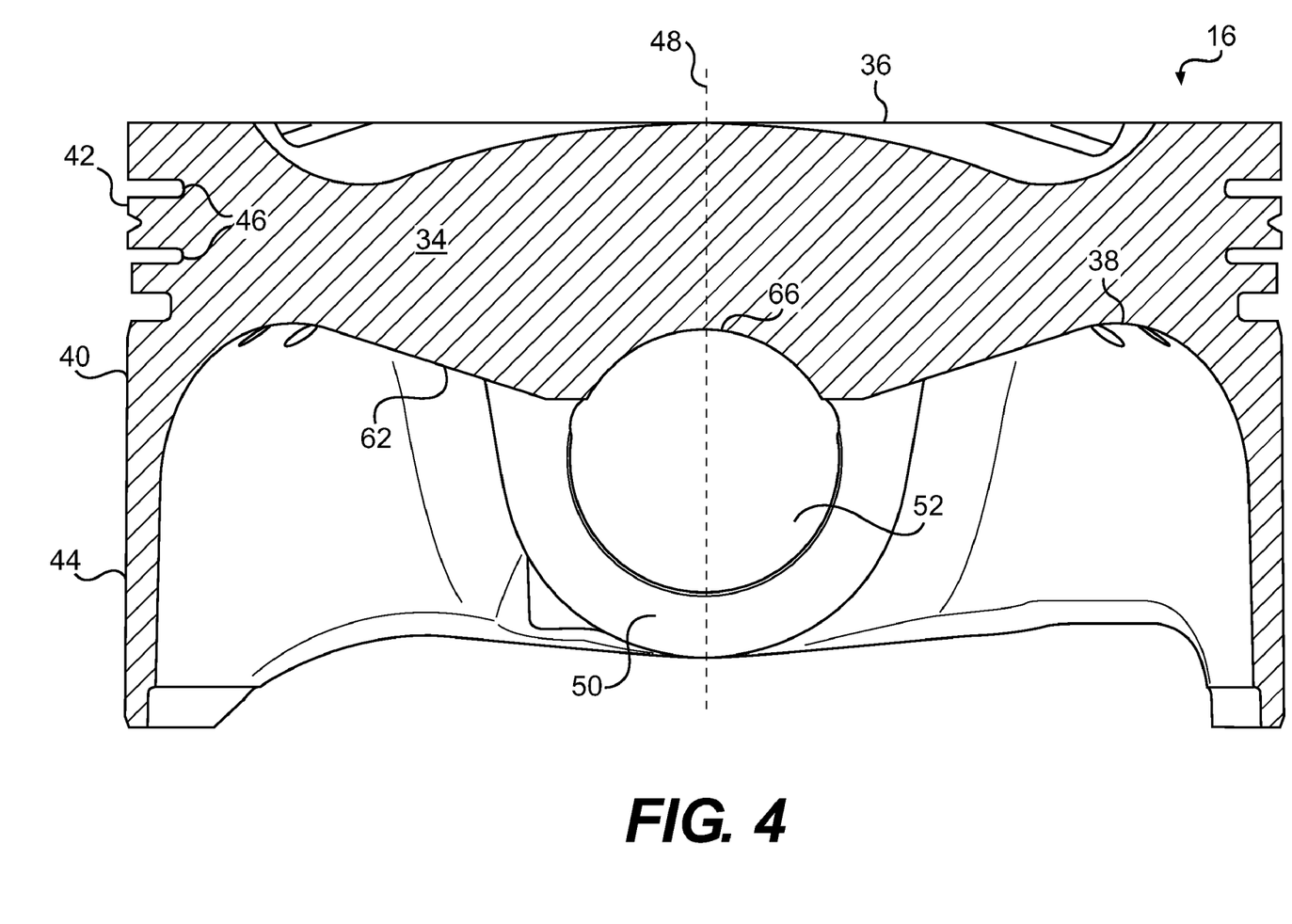
FIG. 4 is a cross-sectional view of the piston of FIG. 2, taken along the line 4-4 of FIG. 3.
Figure 5:
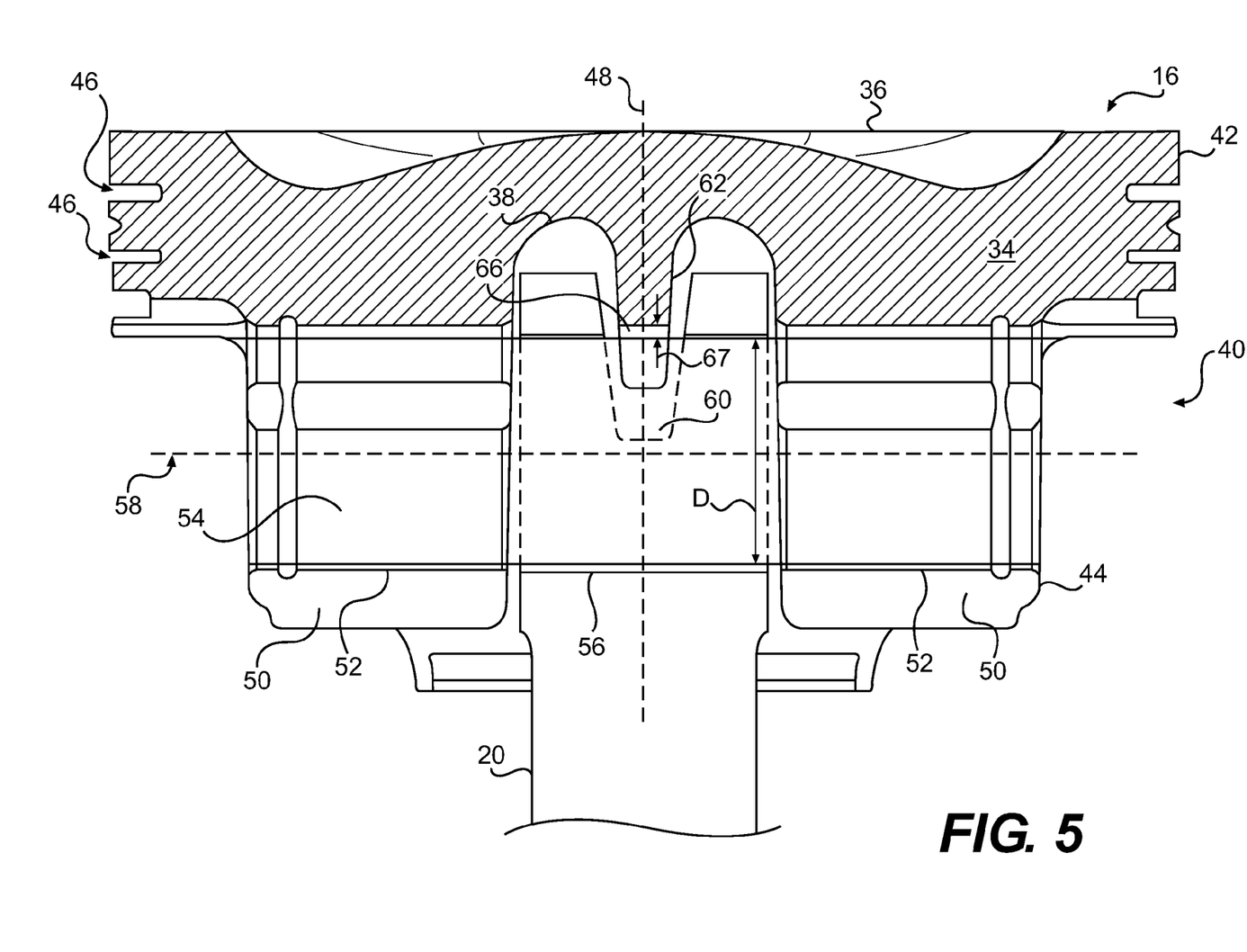
FIG. 5 is a cross-sectional view of the piston of FIG. 2, taken along the line 5-5 of FIG. 3, and with a portion of the connecting rod being shown.

The boss 62 forms a rib that extends outwardly from the second side 38 of the piston body 34, and is generally centered between the pin bores 52 and in alignment with the connecting rod 20. The boss 62 has a longitudinal axis 64 that is generally perpendicular to both the cylinder axis 48 and the piston pin axis 58. The boss 62 has a length L in the direction of the axis 64 and a width W in the direction of the axis 58 (FIG. 3). The length L is longer than the width W, and is preferably also longer than the radius of the piston body 64. A recessed portion 66 in a longitudinal center portion of the boss 62 extends generally toward the second side 38 of the piston body 34. The recessed portion 66 is approximately in the shape of a circular arc having a center of curvature generally on the axis 58. The recessed portion 66 receives therein a part of the piston pin 54. The contour of the recessed portion 66 generally follows the contour of the piston pin 54. When the engine 10 is not in operation, the recessed portion 66 either contacts the piston pin 54 or forms a small clearance 67 (FIG. 5) between the recessed portion 66 and the piston pin 54. The clearance 67 is preferably less than 1% of the diameter D of the piston pin. The connecting rod 20 is provided with a slot 60 (FIG. 5) in general alignment with the boss 62 to permit the connecting rod 20 to pivot with respect to the piston body 34 without being obstructed by the boss 62. It is contemplated that the piston body 34 may alternatively have two or more generally parallel bosses 62, in which case the connecting rod 20 would have either a corresponding number of slots 60 or a correspondingly large slot 60.

Figure 6:
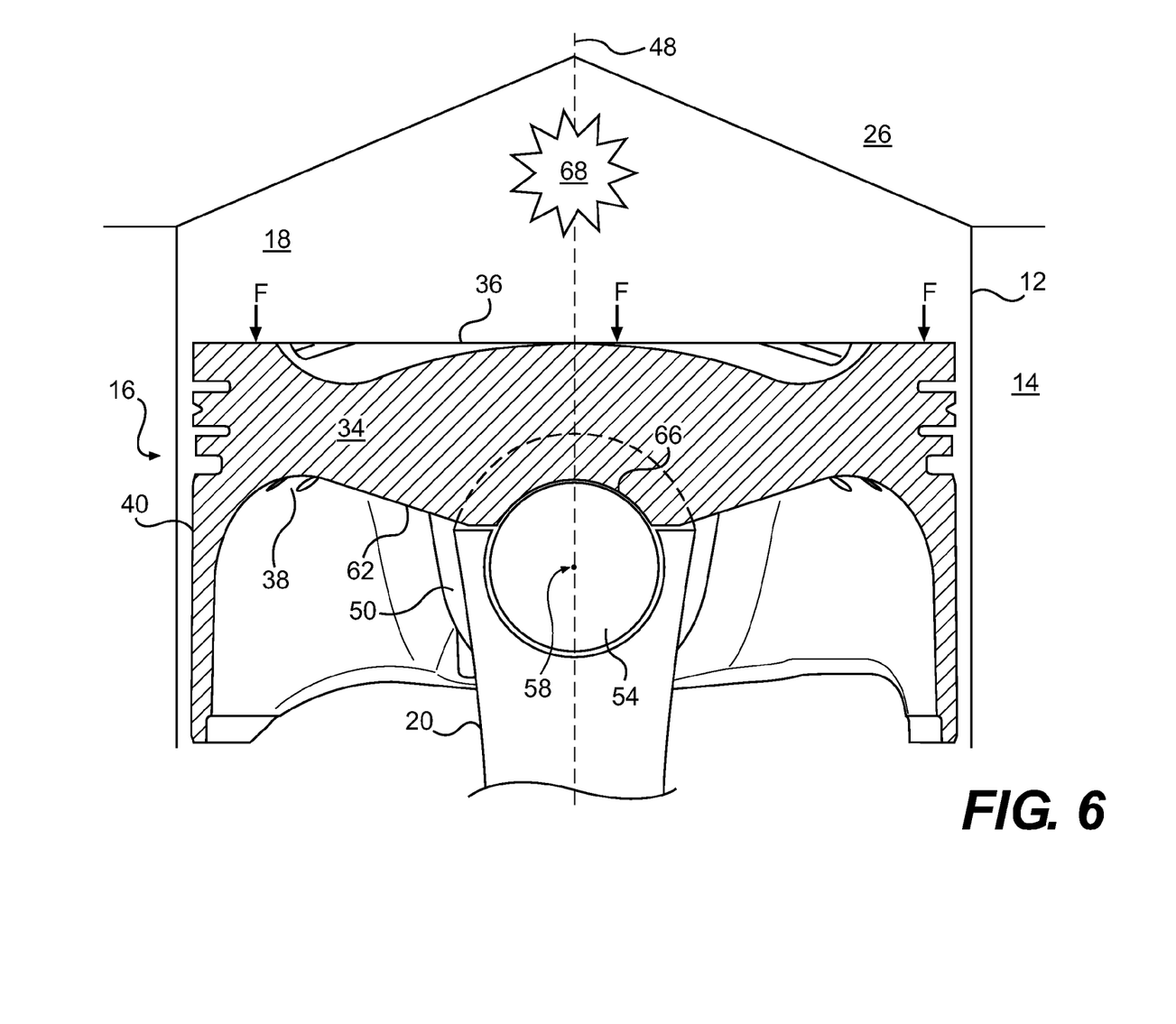
FIG. 6 is a cross-sectional view of a combustion chamber formed in part by the piston of FIG. 2.

Referring to FIG. 6, when the engine 10 is in operation, the piston face 36 is subjected to a force F every time fuel combustion 68 occurs in the combustion chamber 18. The structural rigidity of the boss 62 resists the deformation of the piston body 34 that would otherwise occur as previously mentioned, and maintains its original shape, thereby reducing the stress on the piston body 34. If the force F is sufficient to overcome the rigidity of the boss 62 and deform the piston body 34, the recessed portion 66 is forced into contact with the piston pin 54 before too much deformation occurs, thereby increasing the structural rigidity of the piston 16 and further resisting additional deformation. The contact surface between the recessed portion 66 and the piston pin 54 may be lubricated by oil (not shown) from the engine 10 that is sprayed toward the second side 38 of the piston body 34 for cooling and lubrication.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A piston for an internal combustion engine, comprising:
   a piston body having a first side, a second side opposite the first side, and a lateral surface extending therebetween, the lateral surface having a generally cylindrical piston head portion and a skirt portion, the piston head portion defining a reciprocation axis of the piston;
   two pin bores being disposed on the second side for receiving a piston pin, the two pin bores being generally coaxial and defining a piston pin axis;
   at least one rib disposed on the second side and extending outwardly therefrom, the at least one rib being aligned laterally between the two pin bores in a direction along the piston pin axis, the at least one rib having a longitudinal axis extending perpendicular to both the reciprocation axis and the piston pin axis;
   the at least one rib having a length in the direction of the longitudinal axis and a width in the direction of the piston axis, the length being greater than the width.

2. The piston of claim 1, wherein the at least one rib has a recessed portion extending generally toward the second side of the piston body, the recessed portion being positioned generally at a longitudinal center portion of the at least one rib.

3. The piston of claim 2, wherein a shape of the recessed portion is generally a circular arc.

4. The piston of claim 3, wherein a center of curvature of the recessed portion is disposed generally on the pin axis.

5. The piston of claim 1, wherein the at least one rib is a single rib.

6. The piston of claim 1, wherein the at least one rib is generally centered between the pin bores.

7. The piston of claim 1, wherein the length of the at least one rib is greater than a radius of the piston body.

8. An internal combustion engine, comprising:
   a crankcase;
   a crankshaft rotatably supported in the crankcase;
   a cylinder block attached to the crankcase;
   at least one cylinder formed in the cylinder block;
   each cylinder having:
      a connecting rod having a first end pivotally connected to the crankshaft and pivotable with respect thereto; and a second end;
      a piston disposed in the cylinder and capable of reciprocal motion therein along a cylinder axis, the piston having:
         a piston body having a first side, a second side opposite the first side, and a lateral surface extending therebetween, the first side and the cylinder forming at least in part a combustion chamber, the lateral surface having a generally cylindrical piston head portion and a skirt portion,
         two pin bores disposed on the second side of the piston body;
         a piston pin received in the pin bores, the piston pin having a longitudinal piston pin axis perpendicular to the cylinder axis, the piston pin being pivotally connected to the second end of the connecting rod, the connecting rod being pivotable with respect to the piston about the piston pin axis; and
         at least one rib disposed on the second side and extending outwardly therefrom, the at least one rib being generally aligned with the connecting rod in the direction parallel to the piston pin axis;
         the at least one rib having a longitudinal axis extending generally perpendicular to both the cylinder axis and the piston pin axis, the at least one rib having a length in the direction of the longitudinal axis and a width along the piston axis, the length being greater than the width.

9. The internal combustion engine of claim 8, wherein the at least one rib has a recessed portion extending generally toward the second side of the piston body, the piston pin being disposed at least in part in the recessed portion.

10. The internal combustion engine of claim 9, wherein a shape of the recessed portion is generally a circular arc.

11. The internal combustion engine of claim 10, wherein:
   a contour of the recessed portion generally follows a contour of the piston pin; and
   the contour of the recessed portion and the contour of the piston pin form a clearance therebetween, the clearance being less than 1% of a diameter of the piston pin.

12. The internal combustion engine of claim 8, wherein the at least one rib is a single rib.

13. The internal combustion engine of claim 8, wherein the at least one rib is generally centered between the pin bores.

14. The internal combustion engine of claim 8, wherein the connecting rod has at least one slot in alignment with the at least one rib.

15. An internal combustion engine, comprising:
   a crankcase;
   a crankshaft rotatably supported in the crankcase;
   a cylinder block attached to the crankcase;
   at least one cylinder formed in the cylinder block;
   each cylinder having:
      a connecting rod having a first end pivotally connected to the crankshaft and pivotable with respect thereto; and a second end having at least one slot therein;
      a piston disposed in the cylinder and capable of reciprocal motion therein along a cylinder axis, the piston having:
         a piston body having a first side, a second side opposite the first side, and a lateral surface extending therebetween, the first side and the cylinder forming at least in part a combustion chamber, the lateral surface having a generally cylindrical piston head portion and a skirt portion,
         two pin bores disposed on the second side of the piston body;
         a piston pin received in the pin bores, the piston pin having a longitudinal piston pin axis perpendicular to the cylinder axis and a radius perpendicular to the piston pin axis, the piston pin being pivotally connected to the second end of the connecting rod, the connecting rod being pivotable with respect to the piston about the piston pin axis; and
         at least one boss disposed on the second side, the at least one boss extending outwardly from the second side generally in the direction of the piston pin axis, a portion of the at least one boss generally following a contour of the piston pin, the at least one boss being generally aligned with the at least one slot in connecting rod in the direction parallel to the piston pin axis.

16. A piston for an internal combustion engine, comprising:
   a piston body having a first side, a second side opposite the first side, and a lateral surface extending therebetween, the lateral surface having a generally cylindrical piston head portion and a skirt portion, the piston head portion defining a reciprocation axis of the piston;
   two pin bores being disposed on the second side for receiving a piston pin, the two pin bores being generally coaxial;
   a piston pin received in the pin bores, the piston pin having a piston pin axis;
   at least one rib disposed on the second side and extending outwardly therefrom,
   the at least one rib being aligned laterally between the two pin bores in a direction along the piston pin axis, the at least one rib having a longitudinal axis extending generally perpendicular to both the reciprocation axis and the piston pin axis;
   the at least one rib having a length in the direction of the longitudinal axis and a width in the direction of the piston axis, the length being greater than the width; and
   the at least one rib having a recessed portion extending generally toward the second side of the piston body, the piston pin being disposed at least in part in the recessed portion.

17. The piston of claim 16, wherein a shape of the recessed portion is generally a circular arc.

18. The piston of claim 17, wherein a center of curvature of the recessed portion is disposed generally on the pin axis.

19. The piston of claim 16, wherein the at least one rib is a single rib.

20. The piston of claim 16, wherein the at least one rib is generally centered between the pin bores.

21. The piston of claim 16, wherein the length of the at least one rib is greater than a radius of the piston body.

22. An internal combustion engine, comprising:
   a crankcase;
   a crankshaft rotatably supported in the crankcase;
   a cylinder block attached to the crankcase;
   at least one cylinder formed in the cylinder block;
   each cylinder having:
      a connecting rod having a first end pivotally connected to the crankshaft and pivotable with respect thereto; and a second end;
      a piston disposed in the cylinder and capable of reciprocal motion therein along a cylinder axis, the piston having:
         a piston body having a first side, a second side opposite the first side, and a lateral surface extending therebetween, the first side and the cylinder forming at least in part a combustion chamber, the lateral surface having a generally cylindrical piston head portion and a skirt portion,
         two pin bores disposed on the second side of the piston body;
         a piston pin received in the pin bores, the piston pin having a longitudinal piston pin axis perpendicular to the cylinder axis, the piston pin being pivotally connected to the second end of the connecting rod, the connecting rod being pivotable with respect to the piston about the piston pin axis; and
         at least one rib disposed on the second side and extending outwardly therefrom, the at least one rib being generally aligned with the connecting rod in the direction parallel to the piston pin axis;
         the at least one rib having a longitudinal axis extending generally perpendicular to both the cylinder axis and the piston pin axis, the at least one rib having a length in the direction of the longitudinal axis and a width along the piston axis, the length being greater than the width; and
         the at least one rib having a recessed portion extending generally toward the second side of the piston body, the piston pin being disposed at least in part in the recessed portion.

23. The internal combustion engine of claim 22, wherein a shape of the recessed portion is generally a circular arc.

24. The internal combustion engine of claim 23, wherein:
   a contour of the recessed portion generally follows a contour of the piston pin; and
   the contour of the recessed portion and the contour of the piston pin form a clearance therebetween, the clearance being less than 1% of a diameter of the piston pin.

25. The internal combustion engine of claim 22, wherein the at least one rib is a single rib.

26. The internal combustion engine of claim 22, wherein the at least one rib is generally centered between the pin bores.

27. The internal combustion engine of claim 22, wherein the connecting rod has at least one slot in alignment with the at least one rib.

* * * * *

UNITED STATES PATENT AND TRADEMARK OFFICE
CERTIFICATE OF CORRECTION

| | |
|---|---|
| PATENT NO. | : 8,079,341 B2 |
| APPLICATION NO. | : 12/361750 |
| DATED | : December 20, 2011 |
| INVENTOR(S) | : Franco Dettori, Karl Glinsner and Martin Olejniczak |

It is certified that error appears in the above-identified patent and that said Letters Patent is hereby corrected as shown below:

Col. 6, line 47, in claim 8, the word "generally" should be deleted and it should read -- axis extending perpendicular to both the cylinder --

Signed and Sealed this
Sixth Day of March, 2012

David J. Kappos
*Director of the United States Patent and Trademark Office*